United States Patent
Banker et al.

(10) Patent No.: US 10,605,161 B2
(45) Date of Patent: Mar. 31, 2020

(54) METHOD AND SYSTEM FOR INDICATING DEGRADATION OF BOOSTED ENGINE SYSTEM

(71) Applicant: Ford Global Technologies, LLC, Dearborn, MI (US)

(72) Inventors: Adam Nathan Banker, Canton, MI (US); John Erik Mikael Hellstrom, Ann Arbor, MI (US); Baitao Xiao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 15/599,366

(22) Filed: May 18, 2017

(65) Prior Publication Data
US 2018/0334954 A1 Nov. 22, 2018

(51) Int. Cl.
| | |
|---|---|
| G01M 15/05 | (2006.01) |
| F02B 39/16 | (2006.01) |
| F02B 33/40 | (2006.01) |
| F02B 33/44 | (2006.01) |
| F02B 39/10 | (2006.01) |
| F02D 41/00 | (2006.01) |
| F02D 41/22 | (2006.01) |

(Continued)

(52) U.S. Cl.
CPC .............. *F02B 39/16* (2013.01); *F02B 33/40* (2013.01); *F02B 33/44* (2013.01); *F02B 37/04* (2013.01); *F02B 39/10* (2013.01); *F02D 41/0005* (2013.01); *F02D 41/0007* (2013.01); *F02D 41/221* (2013.01); *F02D 41/08* (2013.01); *F02D 2041/2058* (2013.01); *F02D 2200/021* (2013.01)

(58) Field of Classification Search
USPC ...................................................... 73/114.77
See application file for complete search history.

(56) References Cited

U.S. PATENT DOCUMENTS

| | | |
|---|---|---|
| 6,271,637 B1 | 8/2001 | Kushion |
| 7,353,102 B2 | 4/2008 | Narita et al. |

(Continued)

FOREIGN PATENT DOCUMENTS

| | | |
|---|---|---|
| WO | 2006137279 A1 | 12/2006 |
| WO | 2016005804 A1 | 1/2016 |

OTHER PUBLICATIONS

Xiao, B. et al., "Method and System for Boost Pressure Control," U.S. Appl. No. 15/160,842, filed May 20, 2016, 49 pages.

(Continued)

*Primary Examiner* — Eric S. McCall
(74) *Attorney, Agent, or Firm* — Geoffrey Brumbaugh; McCoy Russell LLP

(57) ABSTRACT

Methods and systems are provided for diagnosing the electrical efficiency of an electric supercharger staged upstream of a turbocharger. During idling conditions, a step-wise incremented signal may be commanded to an electric motor driving the supercharger compressor and changes in compressor speed and total vehicle current may be measured at each step. Degradation of electrical efficiency of the supercharger may be inferred based on deviations between the actual change in compressor speed and total vehicle current relative to the change expected for the given step, and mitigating actions may be accordingly performed.

19 Claims, 4 Drawing Sheets

(51) Int. Cl.
 *F02B 37/04* (2006.01)
 *F02D 41/20* (2006.01)
 *F02D 41/08* (2006.01)

(56) References Cited

U.S. PATENT DOCUMENTS

| | | |
|---|---|---|
| 8,033,272 B2 | 10/2011 | Morizane et al. |
| 2008/0047525 A1 | 2/2008 | Morizane et al. |
| 2009/0183556 A1* | 7/2009 | Shimizu .................. F01D 5/027 |
| | | 73/66 |
| 2012/0024266 A1* | 2/2012 | Serra .................. F02B 29/0418 |
| | | 123/564 |
| 2015/0122234 A1 | 5/2015 | Tanaka |
| 2017/0254277 A1* | 9/2017 | Yoshizawa .............. F02B 37/04 |
| 2018/0216548 A1* | 8/2018 | Claywell .................. F02D 9/08 |

OTHER PUBLICATIONS

Xiao, B. et al., "Method and System for Boost Pressure Control," U.S. Appl. No. 15/160,880, filed May 20, 2016, 51 pages.

* cited by examiner

METHOD AND SYSTEM FOR INDICATING DEGRADATION OF BOOSTED ENGINE SYSTEM

FIELD

The present description relates generally to methods and systems for a boosted engine system have staged charge boosting devices.

BACKGROUND/SUMMARY

Engines may be configured with boosting devices, such as turbochargers or superchargers, to increase mass airflow into a combustion chamber. Turbochargers and superchargers compress intake air entering the engine using an intake compressor. While a turbocharger includes a compressor that is mechanically driven by an exhaust turbine, an electric supercharger includes a compressor that is electrically driven by a motor. In some engine systems, one or more intake charging devices may be staged in series or parallel to decrease engine boost response times.

Electric superchargers may need to be intermittently diagnosed. If the supercharger is degraded, engine performance and fuel economy may be affected. In one example, an electric supercharger may become degraded when components within the supercharger are not able to spin as freely as designed, resulting in a drop in the supercharger's efficiency. This may cause the supercharger motor to draw more electrical power to realize the same relative increase in manifold pressure for a given manifold air flow.

One example approach for diagnosing a supercharger is shown by Morizane et al. in U.S. Pat. No. 8,033,272. Therein, Morizane presents a method for diagnosing an electric supercharger that includes actuating a series of valves, responsive to reaching a temperature threshold after the engine is turned off, and then delivering power to the supercharger motor when the engine is stopped and characterizing the state of the supercharger by detecting an amount of airflow through an intake passage until the airflow reaches a peak value. Other approaches include modeling the compressor to determine its output power, modeling the compressor motor to determine the electrical power consumed by the compressor, and comparing the power consumed with the output power. If the difference between the electrical power consumed and output power exceeds a threshold, degradation of the electric supercharger is indicated.

However the inventors herein have identified potential issues with such approaches. As one example, operating the supercharger when the engine is stopped may deplete the charge level of the battery during conditions when the battery is unable to be recharged. As another example, the operation of the supercharger may cause concern to an operator as an engine system continues to operate after the operator has requested the engine off. As yet another example, the approaches may be computationally complex and may require the coordinated actuation of numerous components, which may each be prone to their own degradation. Additionally, due to constantly changing manifold air flow and pressure when an engine is operating, computational models of the compressor and motor may not be able to appropriately characterize variation of other electrical loads on the vehicle system and those impacts on the diagnostic outcome. As a result, the modeled electrical usage of the motor may differ from the actual usage, resulting in an unreliable diagnosis. As such, monitoring the electrical efficiency of the supercharger may be difficult due to the lack of a direct measurement of its electrical power usage.

In one example, some of the above issues may be addressed by a method for a boosted engine comprising: during engine idling conditions, opening a bypass coupling an electric supercharger to an intake passage; operating an electric motor of the supercharger with step-wise incremented output; and indicating degradation of the supercharger based on a change in each of supercharger compressor speed and vehicle current following the operating. In this way, measureable vehicle current, such as an alternator current, may be advantageously used to assess the electrical efficiency of the supercharger, even as engine electrical loads vary, without affecting engine performance.

As an example, during engine idling conditions, a bypass valve coupling a supercharger compressor to an intake passage may be closed enabling a larger portion of intake airflow to be directed through the compressor. A control signal commanded to an electric motor driving the supercharger compressor may then be increased in a step-wise manner. For example, a first motor speed may be commanded, following which a change in compressor speed and a total vehicle current (such as an alternator current) may be measured. Then, a second motor speed, higher than the first motor speed, may be commanded, following which the change in compressor speed and total vehicle current may again be measured. At each step, the measured change in compressor speed and current may be compared to an expected change, the expected change based on the commanded (e.g., first or second) motor speed. Since the engine electrical demand may change due to engine components other than the electric motor, the change in total vehicle current cannot be assumed to be due exclusively to the supercharger. However, by applying multiple step-changes in supercharger command, and measuring the change in total vehicle current for each step, the current changes due to the supercharger may be isolated. Responsive to the measured change in compressor speed and/or vehicle current being lower than expected, supercharger degradation may be inferred. Further, a degree of degradation may be determined based on the difference and appropriate mitigating steps may be taken in accordance.

In this way, by monitoring changes in the supercharger compressor speed and vehicle current responsive to incremental changes in operation of the electrical motor coupled to the compressor, potential degradation of the electric supercharger efficiency may be reliably identified. The technical effect of using the engine alternator current is that a directly measurable vehicle electrical power usage may be correlated with the electrical power usage of the motor and the electrical efficiency of the supercharger, instead of relying on modeled behavior which may be differ from the actual behavior due to instantaneous vehicle operating conditions. By opportunistically performing the supercharger diagnostics during engine idling conditions, the diagnostics may be completed without inconvenience to the operator and without requiring extensive and complex computation. Additionally, by correlating changes in a command delivered to the supercharger compressor motor with changes in alternator current, the electrical efficiency may be diagnosed while appropriately accounting for any electrical load on the vehicle system, separate from the electrical compressor. Consequently, a more robust diagnostic of an electric supercharger may be provided. By timely diagnosing and addressed supercharger electrical efficiency, component life may be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
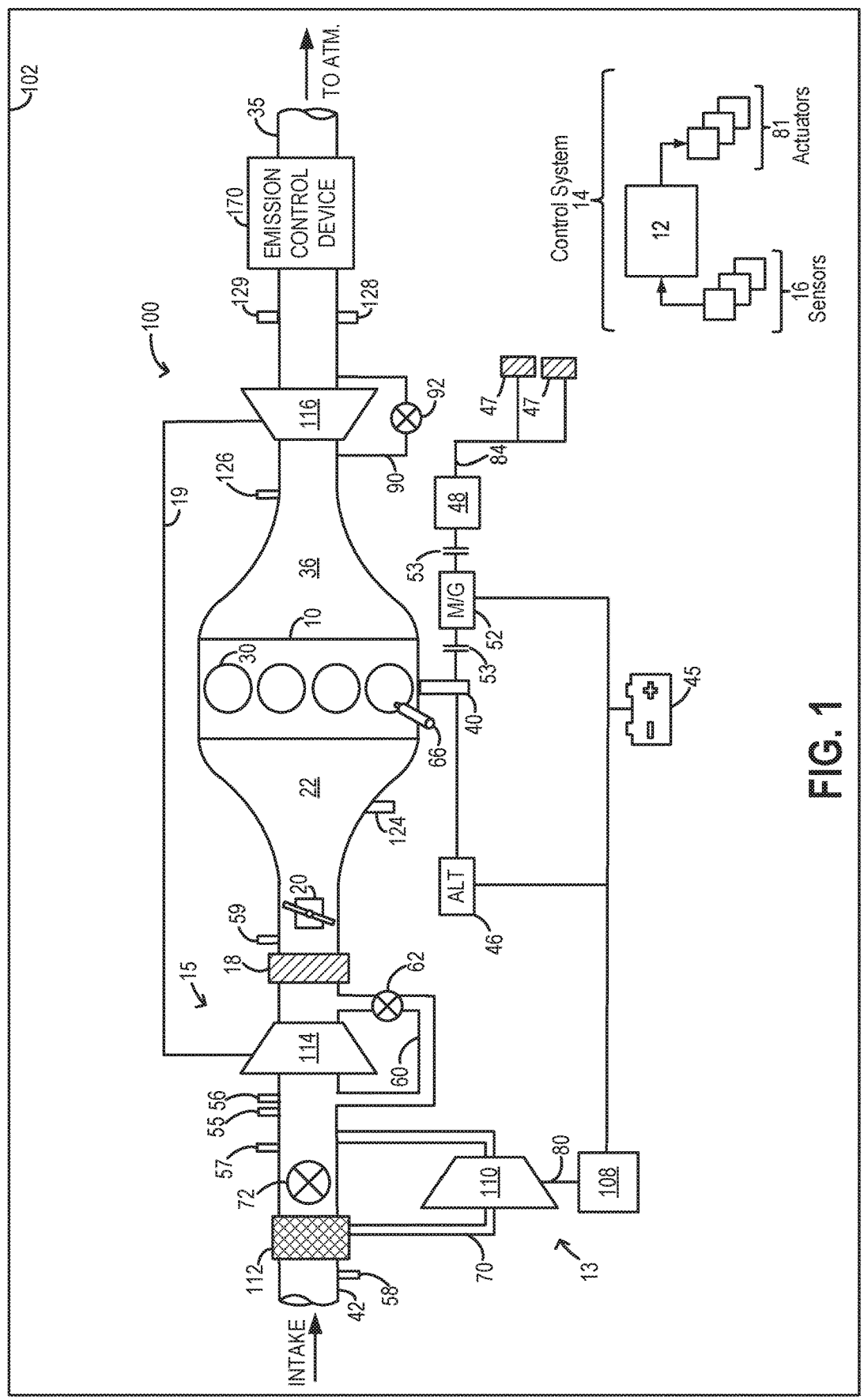
FIG. 1 shows an example embodiment of a boosted engine system having multiple staged charge boosting devices.

The following description relates to systems and methods for monitoring an electric supercharger coupled to a boosted engine, such as the engine system of FIG. 1. As described with reference to the engine system of FIG. 2, operation of the electric supercharger and turbocharger may be adjusted to meet torque demand. The controller may coordinate a supercharger diagnostic routine during an idle condition, adjusting the opening of a bypass valve and monitoring the vehicle current to identify degradation of the electric supercharger, as shown with reference to the example operation of FIG. 3. A prophetic engine operation is shown with reference to FIG. 4, where operation of the electric supercharger may be limited responsive to an indication of degradation of the electric supercharger during a diagnostic routine.

FIG. 1 schematically shows aspects of an example engine system 100 including an engine 10 coupled in vehicle 102. In some examples, vehicle 102 may be a hybrid vehicle with multiple sources of torque available to one or more vehicle wheels 47. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Engine 10 and electric machine 52 are connected via a transmission 48 to vehicle wheels 47 when one or more clutches 53 are engaged. In the depicted example, a first clutch 53 is provided between engine 10 and electric machine 52, and a second clutch 53 is provided between electric machine 52 and transmission 48. Controller 12 may send a signal to an actuator of each clutch 53 to engage or disengage the clutch, so as to connect or disconnect engine 10 from electric machine 52 and the components connected thereto, and/or connect or disconnect electric machine 52 from transmission 48 and the components connected thereto. Transmission 48 may be a gearbox, a planetary gear system, or another type of transmission. The powertrain may be configured in various manners including as a parallel, a series, or a series-parallel hybrid vehicle. In electric vehicle embodiments, battery 45 may be a traction battery that may deliver electrical power to electric machine 52 to provide torque to vehicle wheels 47. In some embodiments, electric machine 52 may also be operated as a generator to provide electrical power to charge a system battery 45, for example during a braking operation. It will be appreciated that in other embodiments, including non-electric vehicle embodiments, system battery 45 may be a typical starting, lighting, ignition (SLI) battery coupled to an alternator 46. In the depicted embodiment, engine 10 is a boosted engine including multiple, staged boosting devices. Specifically, engine 10 includes a first boosting device staged upstream of a second boosting device. The configuration results in a first compressor 110 (of the first boosting device) being positioned in the engine intake passage 42 upstream of a second compressor 114 (of the second boosting device). In the present example, the first boosting device is an electric supercharger 13, while the second boosting device is a turbocharger 15.

Electric supercharger 13 includes first compressor 110 driven by electric motor 108. Specifically, the compressor fan is driven by power received from the electric motor along supercharger compressor shaft 80. Motor 108 is powered by an on-board energy storage device, such as system battery 45. During selected conditions, air may enter first compressor 110 when the opening of electric supercharger bypass valve (ESBV) 72 is decreased, thereby directing incoming air from the air box 112 through the bypass and the first compressor, where it is pressurized for delivery to the second compressor 114. Fresh air received at the compressor inlet of second compressor 114 is then compressed and introduced into engine 10. By increasing the opening of the ESBV 72, an increased amount of air may not enter bypass 70, continuing instead to the second compressor 114 without having passed through the first compressor 110. During conditions when the ESBV is opened, compressed air may be delivered to engine 10 via second compressor 114 of the turbocharger only. In some examples, first compressor 110 of supercharger 13 may additionally be driven by the engine crankshaft, via a clutch and gear mechanism.

Turbocharger 15 includes second compressor 114 driven by a turbine 116. Second compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions. Fresh air is introduced along intake passage 42 into engine 10 via air box 112 and flows to second compressor 114. During selected conditions, as elaborated below, air compressed by turbocharger 15 may be recirculated from the outlet to the inlet of second compressor 114 through second compressor bypass 60 by adjusting the opening of a compressor recirculation valve (CRV) 62. CRV 62 may be a continuously variable valve and increasing the opening of the recirculation valve may include actuating (or energizing) a solenoid of the valve.

One or both of valves 62 and 72 may be continuously variable valves wherein a position of the valve is continuously variable from a fully closed position to a fully open position. Alternatively, compressor recirculation valve 62 may be a continuously variable valve while compressor bypass valve 72 is an on-off valve. In some embodiments, CRV 62 may be normally partially open during boosted engine operation to provide some surge margin. Herein, the partially open position may be a default valve position. Then, in response to the indication of surge, the opening of CRV 62 may be increased. For example, the valve(s) may be shifted from the default, partially open position towards a fully open position. A degree of opening of the valve(s) during those conditions may be based on the indication of surge (e.g., the compressor ratio, the compressor flow rate, a pressure differential across the compressor, etc.). In alternate examples, CRV 62 may be held closed during boosted engine operation (e.g., peak performance conditions) to decrease boost response time and increase peak performance.

Second compressor 114 is coupled, through charge-air cooler (CAC) 18 (herein also referred to as an intercooler) to throttle valve 20. Throttle valve 20 is coupled to engine intake manifold 22. Air is received at the second compressor from first compressor 110. From the second compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

It will be appreciated that, as used herein, first compressor refers to the upstream of the staged compressors and second compressor refers to the downstream of the staged compressors. In one non-limiting example, as depicted, the second downstream compressor is a turbocharger compressor while the first upstream compressor is a supercharger compressor. However, other combinations and configurations of boosting devices may be possible.

Alternator 46 may be configured to charge battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, as well as electric motor 108 coupled to supercharger compressor 110, based on their corresponding electrical demands. In one example, a current drawn on the alternator may continually vary based on each of operator cabin cooling demand, battery charging requirement, other auxiliary vehicle system demands, and motor torque. A voltage regulator may be coupled to alternator 46 in order to regulate the power output of the alternator based upon system usage requirements, including auxiliary system demands. Furthermore, the amount of electrical power delivered to the electric motor coupled to the supercharger may be varied in order to adjust the duty cycle of the supercharger. In one example, the electric power to the supercharger compressor motor may be increased to increase the speed of the compressor to increase boost pressure, with a corresponding increase in the electrical load applied on the alternator, and a decrease in alternator current.

The electrical supercharger may be periodically diagnosed, such as for electrical and/or mechanical degradation. One possible manifestation of supercharger degradation may result in internal components within the electric supercharger not spinning as freely as designed, thereby lowering the efficiency of the electric supercharger. Specifically, this means the electrical supercharger may draw more electrical power to realize the same relative increase in pressure for a particular airflow. The inventors herein have recognized that while directly measuring the electrical usage of the electrical motor may be difficult, the electrical usage of the motor may be inferred from its effect on the total vehicle current. In particular, a change in alternator current may monitored as motor usage is varied, and used to infer the electrical power usage and electrical efficiency of the supercharger motor. As such, the electrical usage of the motor can become confounded due to the alternator having other electrical loads on it which are continuously varying. Consequently, the change in total vehicle current cannot be assumed to be due exclusively to the supercharger. However, by applying multiple step-changes in supercharger command, and measuring the change in total vehicle current for each step, the effect of the motor can be isolated from the effect of the other electrical loads on the alternator current, and then that measurement can be used to gauge supercharger efficiency. For example, as described with reference to FIG. 3, during selected engine idling conditions, the controller may increase the opening of the bypass valve to reduce a differential pressure across the first compressor. Then, the controller may command the supercharger motor 108 to undergo several step-wise changes while the controller monitors the supercharger speed and the alternator current. By comparing the actual change in compressor speed and alternator current to an expected change based on the step-wise commands, it may be determined whether the electric supercharger is degraded.

Returning to FIG. 1, engine torque may be transferred to vehicle wheels 47 via powertrain shaft 84. Specifically, engine torque may be relayed from crankshaft 40 to transmission 48, and thereon to wheels 47. Transmission 48 may be a fixed ratio transmission including a plurality of gear ratios to allow engine 10 to rotate at a different speed than wheels 47. As previously mentioned, clutch 53 may be provided between engine crankshaft 40 and transmission 48. By changing a torque transfer capacity of the clutch (e.g., an amount of clutch slippage), an amount of engine torque relayed to the wheels via the powertrain shaft may be modulated.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through waste-gate 90, by-passing the turbine. Waste-gate actuator 92 may be actuated open to dump at least some exhaust pressure from upstream of the turbine to a location downstream of the turbine via waste-gate 90. By reducing exhaust pressure upstream of the turbine, turbine speed can be reduced.

The combined flow from the turbine and the waste-gate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$, when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to the intake passage via an EGR passage (not shown) including an EGR cooler and an EGR valve. EGR may be recirculated to the inlet of first compressor 110, second compressor 114, or both.

One or more sensors may be coupled to an inlet of second compressor 114 (as shown) and/or first compressor 110 (not shown). For example, a temperature sensor 55 may be coupled to the inlet for estimating a compressor inlet temperature. As another example, a pressure sensor 56 may be coupled to the inlet for estimating a pressure of aircharge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the aircharge recirculated from upstream of the CAC. One or more sensors may also be coupled to intake passage 42, upstream of first compressor 110, for determining a composition and condition of aircharge entering the compressor. These sensors may include, for example, manifold air flow sensor 57, and a barometric pressure sensor 58. In addition, a throttle inlet pressure (TIP) sensor 59 may be coupled downstream of the CAC and upstream of throttle valve 20 for estimating a boost pressure delivered to the engine.

During an operator tip-in event, when going from engine operation without boost to engine operation with boost responsive to an increase in operator torque demand, turbo lag can occur. This is due to delays in turbine spin-up and reduced flow through second compressor 114 when the throttle valve opens at the tip-in. The same may also occur when the engine is operating boosted and there is a transient increase in boost demand due to an increase in accelerator pedal application by the vehicle operator. To reduce this turbo lag, during those selected conditions, both supercharger 13 and turbocharger 15 may be enabled. Specifically, responsive to the tip-in, the waste-gate actuator 92 may be closed (e.g., fully closed) to increase exhaust flow through turbine 116. While turbine 116 spins-up, boost pressure can be transiently provided by upstream supercharger compressor 110. Enabling the supercharger includes drawing energy from battery 45 to spin motor 108, to thereby accelerate first compressor 110. In addition, bypass valve 72 may be closed (e.g., fully closed) so as to enable a larger portion of intake air to be flowed through and compressed by first compressor 110. In addition, CRV 62 may be closed (e.g., fully closed) so as to increase flow through downstream second compressor 114. When the turbine has sufficiently spun up, and is capable of driving second compressor 114, the first compressor may be decelerated by disabling motor 108 (by discontinuing flow of electrical energy to the motor from the battery 45). In addition, bypass valve 72 may be opened so as to enable a larger portion of air to bypass first compressor 110.

During an operator tip-out event, when going from engine operation with boost to engine operation without boost, or reduced boost, compressor surge can occur. This is due to a decreased flow through the second compressor 114 when the throttle valve closes at the tip-out. The reduced forward flow through the second compressor can cause surge and degrade turbocharger performance. In addition, surge can lead to NVH issues such as undesirable noise from the engine intake system. To enable the torque demand to be rapidly reduced responsive to the tip-out without incurring compressor surge during a default mode of vehicle operation, at least a portion of the aircharge compressed by second compressor 114 may be recirculated to the compressor inlet. This allows excess boost pressure to be substantially immediately relieved. In particular, compressor recirculation valve 62 may be opened to recirculate (warm) compressed air from the compressor outlet of second compressor 114, upstream of charge-air cooler 18 to the compressor inlet of second compressor 114. In some embodiments, the compressor recirculation system may alternatively, or additionally, include a recirculation passage for recirculating (cooled) compressed air from the compressor outlet, downstream of the charge-air cooler to the compressor inlet. In addition, waste-gate actuator 92 may be moved to a more open (e.g., fully open) position so that more of the exhaust flow travels to the tailpipe while bypassing the turbine, thereby expediting turbine spin-down.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the turbine, MAP sensor 124, exhaust temperature sensor 128, exhaust pressure sensor 129, compressor inlet temperature sensor 55, compressor inlet pressure sensor 56, MAF sensor 57, BP sensor 58, and TIP sensor 59. Other sensors such as additional pressure, temperature, air/fuel ratio, and composition sensors may be coupled to various locations in engine system 100. The actuators 81 may include, for example, throttle valve 20, compressor recirculation valve 62, compressor bypass valve 72, electric motor 108, waste-gate actuator 92, and fuel injector 66. The control system 14 may include a controller 12.

The controller 12 may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIGS. 2-3. As an example, responsive to supercharger diagnostic conditions being met, the controller may send a series of step-wise changing (e.g., step-wise increasing or decreasing) commands to the electric motor driving the supercharger compressor. In addition, the controller may send a signal to an actuator of the bypass valve to actuate the valve to a more open position that enables a defined pressure difference to be provided across the supercharger compressor.

In this way, the components of FIG. 1 enables a vehicle system comprising an engine having an intake; a first intake compressor driven by an electric motor; a second intake compressor driven by an exhaust turbine positioned downstream of the first compressor along the intake; a bypass including a bypass valve coupled across the first compressor; a battery providing electrical power to the electric motor; an alternator coupled to the engine and providing electrical power to the battery and one or more engine electrical loads; a speed sensor for estimating a speed of the first compressor; an electrical circuit for estimating a current drawn on the alternator; and a controller. The controller may be configured with computer readable instructions stored on non-transitory memory for: during engine idling conditions, with the bypass valve open, sequentially commanding duty cycles of step-wise increasing or decreasing pulse-width to the electric motor; following each commanded pulse-width, monitoring a change in each of the speed of the first compressor and the alternator current; responsive to the monitored change being less than a threshold, indicating degradation in supercharger electrical efficiency; and responsive to the indication of degradation, limiting a boost pressure applied via the first compressor during subsequent boosted engine operation. In one example, indicating degradation includes indicating a degree of the degradation as a function of a difference between the monitored change and the threshold. In a further example, the limiting the boost pressure applied via the first compressor during the subsequent boosted engine operation includes, responsive to the degree of degradation being higher than a threshold, holding the bypass valve open, independent of operator torque demand; and responsive to the degree of degradation being lower than the threshold, compensating for the degradation by increasing a duty cycle commanded to the electric motor. In one example, the threshold is based on the commanded pulse-width, the threshold increased as the commanded pulse-width is step-wise increased or decreased. In one example, the vehicle is a hybrid vehicle, the system further comprising a vehicle cabin and an air conditioner, and wherein the controller includes further instructions for: continually varying the alternator current drawn on the alternator based on the electrical loads applied via each of operator cabin cooling demand, battery charging requirement, and motor torque.

Figure 2:
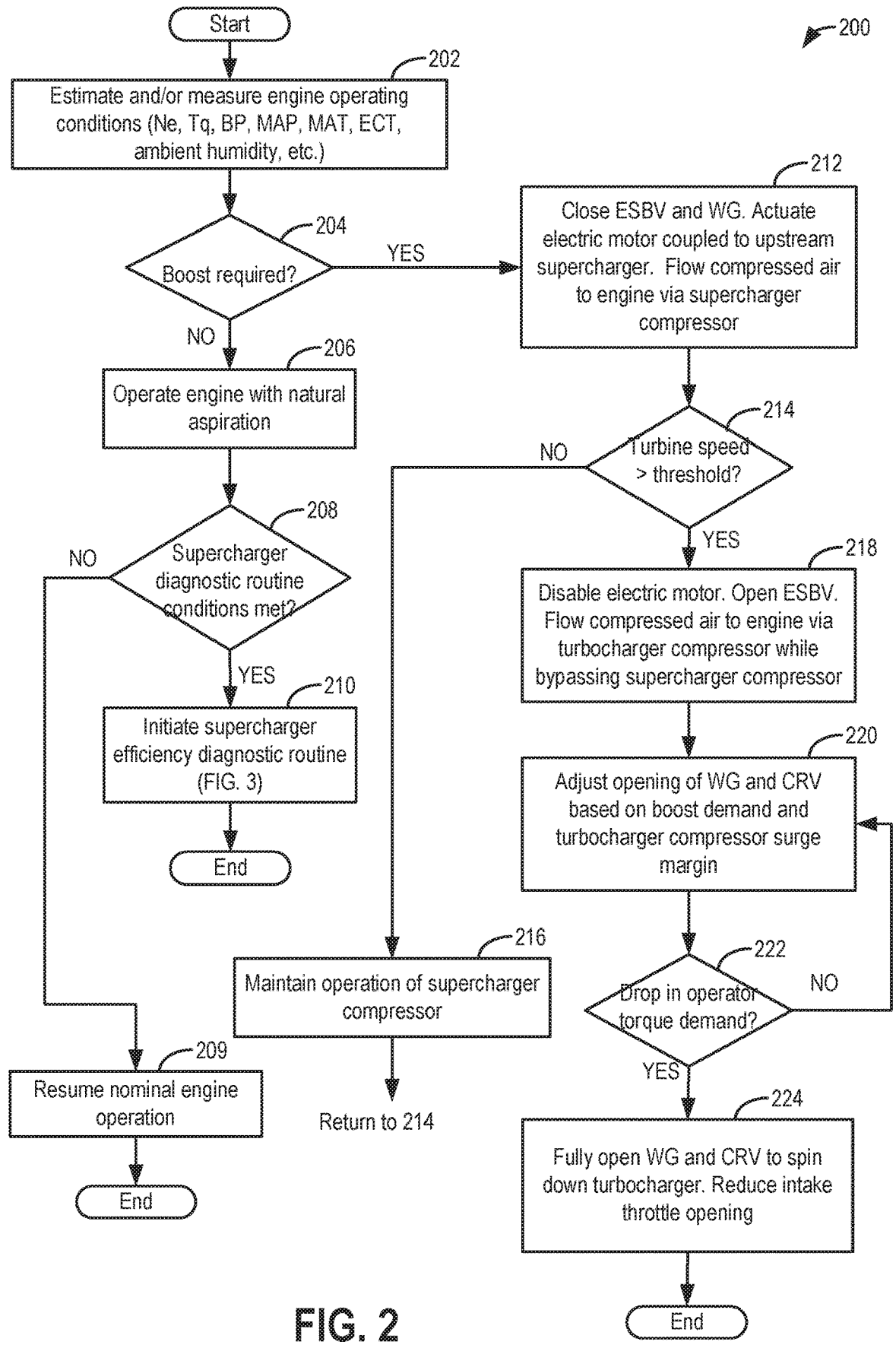
FIG. 2 shows a high level flowchart illustrating a routine that may be implemented to operate a boosted engine system including an electric supercharger and a turbocharger.

Turning now to FIG. 2, an example routine 200 is shown for operating a boosted engine having staged intake charging devices. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating operating conditions for an engine (e.g., engine 10 of FIG. 1), such as engine speed, pedal position, operator torque demand, manifold absolute pressure, manifold air flow, manifold air temperature, ambient conditions (such as ambient temperature, barometric pressure, and humidity), engine coolant temperature, etc. At 204, the method includes determining if boost is requested. In one example, boost may be requested at mid-high engine loads. In another example, boost may be requested in response to an operator pedal tip-in or increase in driver torque demand. If boost is not requested, such as when the engine load is low or the driver torque demand is low, the method moves to 206 wherein the engine is operated with natural aspiration.

At 208, the method includes determining whether supercharger diagnostic routine conditions have been met. In one example, supercharger diagnostic routine conditions may be considered met if a threshold duration or distance has elapsed since a last iteration of the diagnostic routine. In addition, the supercharger diagnostic routine may be initiated once engine idling conditions are confirmed. For example, supercharger diagnostic routine conditions may be considered met if the engine has been operating at an idle condition for more than a threshold duration (or is expected to remain in the idle condition for at least a threshold duration, such as a duration required to complete the diagnostic routine). In still further examples, supercharger diagnostic routine entry conditions may require a vehicle transmission (e.g., transmission 48 of FIG. 1) being in park, and an engine coolant temperature being above a threshold (e.g., indicating the engine is sufficiently warm). Thus, the routine may be aborted if the operator actuates (or is expected to actuate) the accelerator pedal, if the operator shuts off the engine (or is expected to imminently shut down the engine), or during an engine cold-start.

Figure 3:
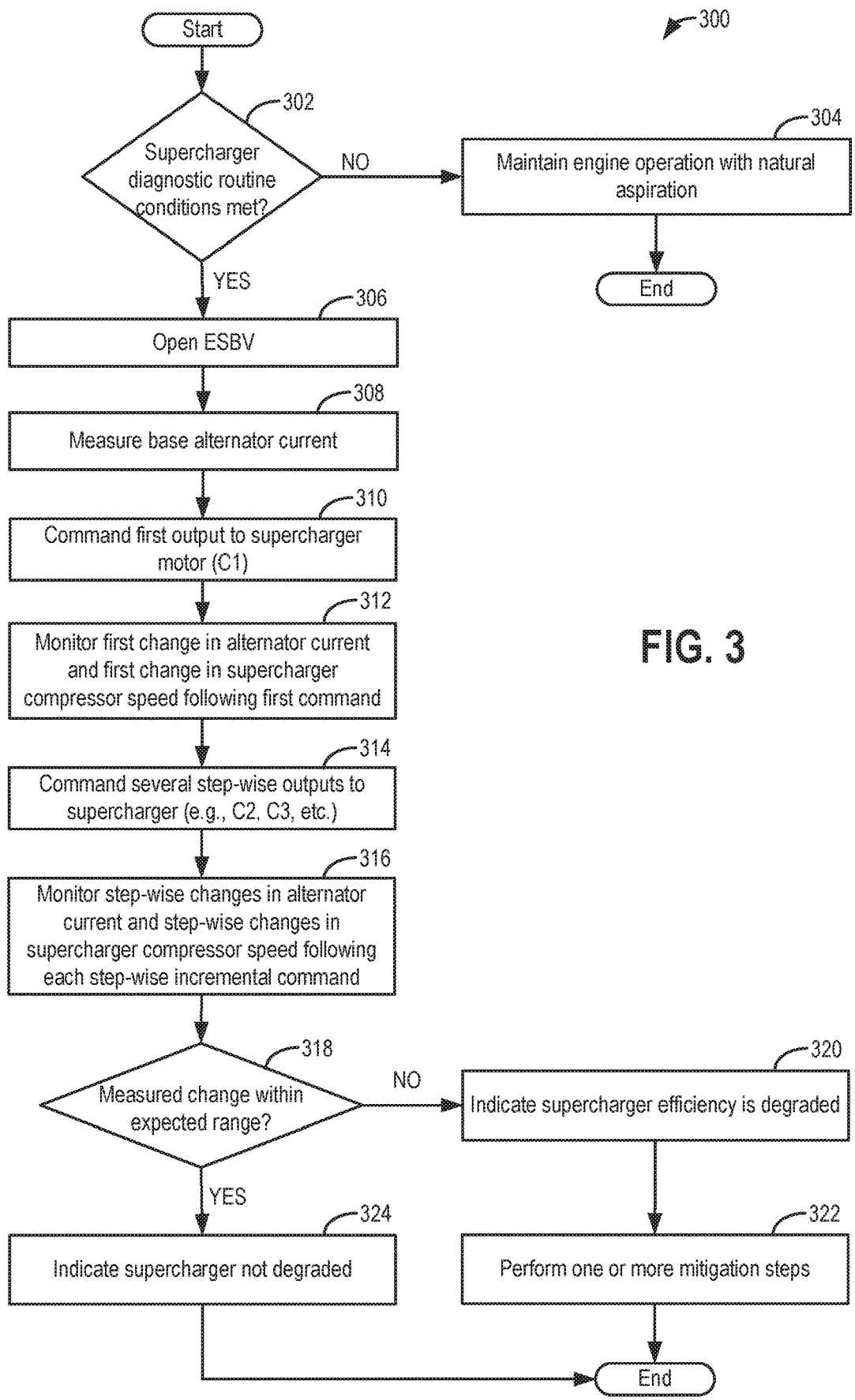
FIG. 3 shows a flowchart illustrating an example electric supercharger diagnostic routine performed during an idle condition.

If the supercharger diagnostic routine conditions are met, then the routine continues to 210, where the routine includes initiating the supercharger efficiency diagnostic routine as described further in FIG. 3. If the supercharger diagnostic routine conditions are not met, then the routine resumes nominal engine operation at 209 including maintaining engine operation with natural aspiration if operator torque demand is low, or initiating boost delivery if operator torque demand increases. The routine then ends.

If boost is requested at 204, then the routine continues to 212, where the method includes closing each of an exhaust waste-gate valve (such as waste-gate actuator 92 of FIG. 1) and an electric supercharger bypass valve (such as ESBV 72 of FIG. 1). By closing the waste-gate valve, exhaust flow through the turbocharger turbine is increased, expediting spin-up of the turbine (such as turbine 116 of FIG. 1). By closing the bypass valve, air flow is increased through a bypass (such as bypass 70 of FIG. 1) coupling a supercharger compressor (such as first compressor 110) to the intake passage (such as intake passage 42 of FIG. 1). Optionally, a compressor recirculation valve (such as CRV 62 of FIG. 1) may also be closed so that pressure loss across a turbocharger compressor (such as second compressor 114 of FIG. 1) is reduced. In one example, the ESBV, the CRV, and the waste-gate valve are moved to fully closed positions responsive to signals commanded by the controller (such as controller 12 of FIG. 1) to corresponding valve actuators. Alternatively, the ESBV, CRV, and the waste-gate valve may be moved to a more closed position that enables the turbine to spin-up while maintaining sufficient margin to surge for the supercharger and turbocharger compressors.

Also at 212, the method includes actuating the electric motor (e.g., motor 108 of FIG. 1) coupled to the upstream supercharger compressor thereby accelerating the first, upstream compressor while the turbine coupled to the second, downstream compressor spins up. Herein, in response to an increase in driver demanded torque, the first compressor is accelerated and the flow of compressed air to the engine is increased. The first compressor is staged upstream of the second compressor along an air intake passage, the first compressor driven by an electric motor while the second compressor is driven by an exhaust turbine. Accelerating the first compressor includes spinning the first compressor via the electric motor using power drawn from a battery (e.g., battery 45). For example, the first compressor may be spun by adjusting an electromechanical actuator coupled to an electric motor of the supercharger to rotate the motor at a higher speed by sending a duty cycle control signal from the controller to the actuator. In one example, the controller may send a signal to the actuator to operate the electric motor at a full (e.g., 100%) duty cycle, thereby enabling the supercharger compressor to be spun at a full speed. Alternatively, the second compressor may be accelerated at a speed based on the increase in boost or torque demand. Thus, at this time, compressed air is provided to the engine via only the first compressor. As such, electric superchargers may have a response time (that is, idle to 100% duty cycle) of 130-200 ms and therefore may be able to deliver boost much faster compared to a typical turbocharger response time (1-2 second). Therefore, the first compressor of the electric supercharger may be able to fill the turbo lag significantly faster. However, they may only be able to provide the transient boost response for a limited duration, the duration limited by the state of charge of the system battery powering the electric motor.

At 214, it is determined if the turbine speed is higher than a threshold speed, such as above a threshold speed where the turbocharger is able to drive the second compressor and sustain the boost demand. If the turbine speed is not higher than a threshold speed, then the routine continues to 216, where the routine includes maintaining operation of the supercharger compressor (e.g., via the electric motor). The routine then returns to 214 to continue monitoring the turbine speed.

If turbine speed is higher than the threshold speed, then at 218, the method includes decelerating the first compressor by disabling the electric motor, for example based on a signal sent from the controller to an electromechanical actuator of the motor that reduces motor rotation speed. Additionally, the ESBV may be opened allowing intake air to flow to engine via the second compressor (of the turbocharger), while bypassing the first compressor (of the supercharger). Specifically, an electromechanical actuator coupled to the bypass valve in the bypass across the first compressor may be adjusted to rotate the bypass valve to a more open position responsive to a control signal from the controller to the actuator. Thus, after the turbine has spun up sufficiently, the method includes bypassing the first, upstream compressor and providing a flow of compressed air to a piston engine via the second, downstream compressor. At this time, compressed air is provided to the engine via the second compressor and is not provided to the engine via the first compressor. In this way, by transiently operating the first compressor of the supercharger until the turbocharger turbine is spun up, turbo lag due to delays in spinning up the turbocharger turbine are reduced.

At 220, the method includes adjusting an opening of the waste-gate actuator and the compressor recirculation valve based on operator boost demand and the turbocharger compressor surge margin. In one example, if the turbocharger is within a threshold range of surge, the openings of one or both of the compressor recirculation valve and waste-gate actuator may be increased. As a result, the amount of compressed air leaving the second, downstream compressor and entering the engine is reduced, thereby reducing the likelihood of surge.

At 222, the method includes determining whether a drop in operator torque demand has occurred. If no drop in operator torque demand has occurred, then the routine returns to 220, where the opening of the waste-gate actuator and the opening of the compressor recirculation valve are continued to be adjusted based on boost demand and the surge margin of the turbocharger compressor. If there is a drop in operator torque demand, then the routine continues to 224, where the method includes fully opening the waste-gate actuator and fully opening the compressor recirculation valve to spin down the turbocharger. Additionally, at 224, the opening of the intake throttle valve may be reduced, before the method ends.

Turning now to FIG. 3, an example supercharger diagnostic routine 300 is shown for a boosted engine having staged intake charging devices. In one example, the method of FIG. 3 may be performed as part of the method of FIG. 2, such as at 210. The method enables supercharger electrical degradation to be timely identified and addressed.

At 302, the method includes confirming whether supercharger diagnostic routine conditions have been met. As described with reference to FIG. 2, supercharger diagnostic routine conditions may be considered met if the engine is idling and a threshold duration has elapsed since a last iteration of the diagnostic routine. In addition, it may be confirmed that a vehicle transmission is in park, and the engine is sufficiently warm.

If supercharger diagnostic routine conditions are not met, the method moves to 304 where the engine is nominally operated with natural aspiration or boost pressure adjusted based on operator torque demand. Then the routine ends. If the supercharger diagnostic routine conditions are met, the routine continues to 306, where the routine includes opening the electric supercharger bypass valve. In one example, the bypass valve is fully opened to reduce the delta pressure across the supercharger compressor. In alternate examples, the opening of the bypass may be reduced to provide a defined pressure difference across the supercharger compressor.

Next, at 308, the routine includes measuring a base alternator current of the vehicle system. In one example, measuring a base alternator current may include using an ammeter or shunt resistor coupled to a vehicle alternator (e.g., alternator 46 of FIG. 1) to measure a baseline power level of the charging system. In another example, an alternate electrical circuit coupled to the alternator may be used to measure the alternator current. In still another example, an alternator sub-system or module may be coupled to the engine controller and the alternator current provided may be adjusted via control signals sent from the engine controller to the alternator sub-system/module. It will be appreciated that any suitable method of measuring the total current or total power across the engine system may be used.

At 310, the routine includes commanding a first output C1 to the electrical supercharger motor. In one example, first output C1 may include increasing the electrical current drawn from the system battery via the alternator to the supercharger motor by a predetermined incremental amount. The first output C1 commanded to the electrical supercharger may correspond to an expected incremental increase in supercharger compressor speed. The routine then proceeds to 312, where the routine includes monitoring a first change in alternator current and a first change in supercharger compressor speed following the first command C1.

In one example, monitoring a first change in alternator current may include measuring a current across an alternator using an ammeter or shunt resistor coupled to a vehicle alternator. In still another example, where the alternator is coupled to the engine controller via an alternator sub-system/module, the total alternator current may be measured by the alternator sub-system. As previously mentioned, in other examples, other suitable methods for determining the energy usage of the vehicle electrical charging system may be used. Monitoring a change in supercharger compressor speed following a command as described above may include measuring the compressor speed before and after the command (e.g., C1) using a speed sensor coupled to the supercharger compressor.

As such, when the engine is at idle or when the engine is off/shut-down, boost is not required. With no boost required, the electric compressor bypass valve (ESBV) can be opened. When the ESBV is open, the electric supercharger compressor can spin up without increasing system temperatures or pressures because the air only recirculates around the compressor.

At 314, the routine includes commanding step-wise outputs (e.g., incremental outputs) to the supercharger. These additional outputs may be described herein as C2 and C3, and so in, but it will be appreciated that any number of step-wise incremental outputs may be used. Step-wise incremental outputs may include increasing the electrical power drawn from the system battery and increasing the electrical current applied from the alternator to the supercharger motor by predetermined incremental amounts. In one example, the size of the incremental output commands may be based on mapped data, or output commands may be based on current engine operating conditions. In one example, each step of the step-wise increasing is of the same size. In another example, each step is of a different size. For example, a first command delivered to the electric motor may provide a first increase in the motor speed from rest. A second, subsequent command delivered to the electric motor may provide a second, larger increase in the motor speed from a non-zero speed. In one example, the sizes of the steps may be based on an earlier ES characterization or calibration so as to provide steps that are large enough to provide a detectable change in power. In the depicted example, the incremental outputs include step-wise increasing alternator current from C1 to C3, but it will be appreciated that the incremental outputs may either increase or decrease as the diagnostic routine is executed, and the order in which specific commands are sent to the electric supercharger motor may be changed. Furthermore, the step-wise changes to the current may include a step-wise increase, a step-wise decrease, or a step-increase followed by a step-decrease (or vice versa).

At 316, the routine includes monitoring the step-wise changes in alternator current and step-wise changes in supercharger compressor speed following each step-wise incremental command delivered to the electric motor. The inventors have recognized that vehicle electrical demands may vary during the diagnostic routine, and so the total alternator current drawn by the alternator from the system battery may also vary. For example, electrical demands may vary during the diagnostic routine due to one or more of changes in operator cabin cooling demand, and demand of other auxiliary systems. Still other electrical loads applied on the engine may include, for example, the defroster, heated seats, electric cabin heating, headlights, stereo, auxiliary consumer device (e.g., laptop powered through cigarette lighter or included 120V AC outlet), and any other electrical device being powered via the car. As a result, the change in total vehicle current cannot be assumed to be due exclusively to the supercharger. However, by applying multiple step-wise changes in supercharger command, and measuring the change in total vehicle current for each command, the alternator current changes due to the supercharger may be isolated from those due to the varying vehicle electrical loads. The measured supercharger speed and alternator current may then be compared to expected current and speed values.

As such, it is unlikely that other vehicle loads will change in concert with the intrusive supercharger step changes. With each step change commanded to the ES, it becomes less likely that some other vehicle load is confounding the results. For example, if there was only one step change applied, it may be possible that the operator would turn on the defroster at precisely the time that the ES step change was applied. With only one step, the controller would observe an additional current draw, and the controller may infer that the additional defroster current was for the ES. However, with a second step (which may be step up or down), it becomes less likely that some device was actuated (on/off) at precisely the same time as the ES step. So the more steps that are taken, the change can be determined to be due to the ES exclusively with a higher degree of confidence.

At 318, it is determined whether the measured change in supercharger speed and alternator current is within the expected range. In one example the expected range is based on the supercharger compressor speed and alternator current expected for the corresponding step change in motor command. The expected range may be further based upon acceptable error margins for the current sensing device, and/or an acceptable level of wear and tear of the supercharger where fuel economy and emissions are not adversely affected. If the measured change is within the expected range, then the routine continues to 324, where the routine includes indicating that the supercharger is not degraded before ending the routine. During subsequent engine operation, when there is an increase in operator torque demand, boost may be transiently provided via the supercharger while the turbocharger turbine spins up, and turbo lag may be reduced.

If the measured change is not within the expected range, such as when the measured change is less than the expected range, the routine proceeds to 320, where the routine includes indicating degradation of supercharger efficiency. In one example, this may include one or more of setting a diagnostic code and providing an indication of degradation to the operator. In some examples, this may include illuminating a Malfunction Indictor Lamp (MIL) provided on a display device located in a passenger compartment of the vehicle, or displaying a message on the display device.

Indicating degradation further includes indicating a degree of degradation of the supercharger based on a difference between the measured change and the expected change. As the difference increases, the degree of electrical degradation may be determined to be higher.

Responsive to the indication of degradation of supercharger efficiency, the routine proceeds to 322, where the routine includes performing one or more mitigation steps. The mitigation step may be selected based on the determined degree of supercharger degradation. In one examples, when the degree of degradation is lower, responsive to the indication of degradation, the controller may increase the power commanded to the supercharger's electric motor to provide a given compressor output. For example, the control signal commanded to the electric motor may be increased as a function of the determined difference between the measured change and the expected change. This enables the supercharger output to compensate for less than threshold degrees of degradation of supercharger efficiency in order to continue to meet operator torque demand. In other examples, such as where the degree of degradation is higher (such as above a threshold level of degradation), responsive to the indication of degradation, the controller may disable further operation of the supercharger. As a result, during subsequent engine operation, when there is an increase in operator torque demand, boost may only be provided via the turbocharger and turbo lag may have to be accepted.

In still another example, when the degree of the degradation is higher, the controller may compensate for loss of efficiency, provide an indication to the operator that vehicle performance may be reduced, actuate or light a Malfunction Indicator Light, and change the pedal map to reduce reliance on the ES system. In comparison, when the degree of the degradation is lower, the controller may compensate for loss of efficiency (by commanding a higher duty-cycle for an equivalent desired boost operation, and indication to the operator that vehicle performance may be reduced.

Figure 4:
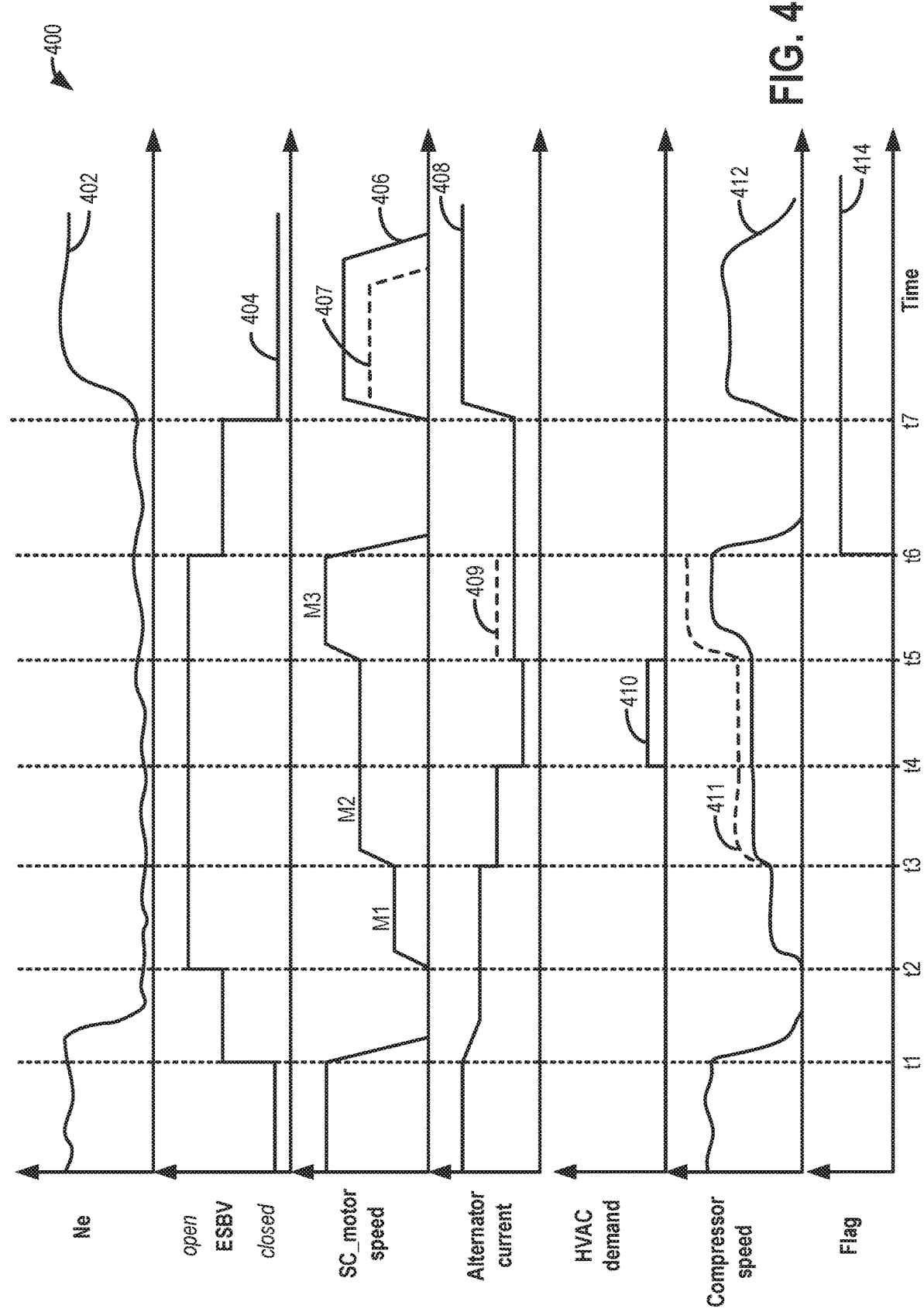
FIG. 4 shows a prophetic operation of a boosted engine, including during a supercharger diagnostic routine.

Turning now to FIG. 4, an example timeline of boosted engine operation is shown including the performing of an electric supercharger diagnostic routine, such as the supercharger diagnostic routine shown in FIG. 3. The supercharger diagnostic routine may be opportunistically performed during engine idling conditions. Map 400 of FIG. 4 depicts an engine speed (Ne) at 402, a position of an electric supercharger bypass valve (ESBV) at 404, a supercharger compressor motor speed at 406, an alternator current at 408, a vehicle heating, ventilation, and air conditioning (HVAC) demand at 410, supercharger compressor speed at 412, and a flag indicative of supercharger degradation at 414. It will be appreciated that unless otherwise specified, any compressor mentioned with reference to FIG. 4 refers to the first, upstream, electric supercharger compressor. Additionally, it will be appreciated that unless otherwise specified, any motor mentioned with reference to FIG. 4 refers to the electric motor coupled to the electric supercharger compressor.

Prior to time t1, the engine is operated at higher engine speed (plot 402) and loads due to increased operator torque demand. In addition, the engine may be operating with boost provided by the electric supercharger to meet the increased torque demand. Consequently, the supercharger motor speed is elevated (plot 406) to drive the supercharger compressor, as shown by the increased supercharger compressor speed (plot 412). The electrical load on the alternator is also increased due to the operation of the electric motor, as reflected by the increased alternator electric current (plot 408). The ESBV is closed (plot 404) so a larger portion of the intake airflow can be directed through the supercharger compressor. No HVAC demand is received at this time (plot 410).

At time t1, an operator pedal tip-out occurs. In response to the decrease in operator torque demand, the engine may be transitioned to operating without boost, and the engine speed may decrease. In the depicted example, engine speed is reduced to idling speed. This includes suspending power delivered to the compressor motor causing the motor to start spinning down to rest. In addition, the compressor speed may start to decrease. The opening of the ESBV may be increased in order to increase the amount of airflow bypassing the first compressor, as shown by plot 404. There is still no HVAC demand at time t1 (plot 410), and, all else being equal, the alternator current drops since motor demand has dropped (plot 408).

Between time t1 and t2, the engine speed decreases to idling speed (plot 402), and at t2, supercharger diagnostic routine conditions are considered met due to the engine being in idling conditions and a threshold duration having elapsed since the previous supercharger diagnostic routine elapsed.

At time t2, the supercharger diagnostic routine is initiated. Therein, while the engine speed remains at idle (plot 402), the opening of the ESBV is increased (e.g., opened) as shown by plot 404 to ensure a low pressure delta across the supercharger compressor. In particular, the ESBV is fully opened to maintain a low pressure change across the supercharger compressor. It will be appreciated that a pressure delta across the supercharger compressor may be defined as the ratio of the pressure downstream of the supercharger compressor to the pressure upstream of the supercharger compressor. The controller then commands an incremental increase in current delivered to the compressor motor, thereby increasing the motor speed (plot 406) and compressor speed (plot 412). In particular, between t2 and t3, the electrical power delivered to the electric motor is increased causing the motor speed to be increased to a first level M1. The compressor speed and the alternator current is expected to increase as a function of M1, if the supercharger is functioning properly. Dashed plot 411 shows the expected compressor speed for the given compressor motor speed. Between t2 and t3, the actual compressor matches the speed expected based on motor speed M1. As shown by plot 408, the increase in motor speed results in a corresponding drop in the alternator current which matches the expected current.

At time t3, the electrical power delivered to electric motor is step-wise incremented causing the motor speed to be increased to a second level M2, higher than first level M1. While this results in an increase in compressor speed, the actual compressor speed is less than the expected compressor speed (plot 411) for the given compressor motor speed level M2. However, the difference is within an expected range and so no flag is set. The additional power delivered to the compressor motor also causes the alternator current to decrease (plot 408), however the alternator current decreases as expected.

In particular, other electrical systems, such as the HVAC, headlights, defrost, etc., all draw current from the alternator. The current for these individual systems is not independently measured, only the total alternator current is measured. At any single step command to the ES, the controller may be unable to separate out all causes of change of alternator current. For example, some of the changes will be due to the step change in the ES compressor speed while other changes may be due to other subsystems. However, by applying multiple step change commands to the supercharger, the ES current change can be separated out from the current change due to the other subsystems since it is unlikely that the other subsystems will have a step change that is synchronized with the step change at the ES.

At time t4, an HVAC demand on the engine increases, such as due to the operator making a request for cabin cooling which results in the air conditioning compressor beginning to run. The HVAC demand causes the alternator current to further decrease. By comparing the change in command to the motor (M2-M1) to the change in alternator current between t3 and t5, the controller is able to characterize the proportion of the total change in alternator current that is due to the HVAC demand relative to the proportion that is due to the motor's power demand. At t5, it may be determined that even with the HVAC demand, the measured change in alternator current is commensurate with the commanded change in motor speed. Also, the difference between the actual compressor speed and the expected compressor speed is still considered within an expected range. Therefore no flag is raised (plot 414).

At time t5, the electrical power delivered to the electric motor is step-wise incremented causing the motor speed to be increased to a third level M3, higher than second level M2. This causes a corresponding increase in compressor speed (plot 412). The engine remains at idle (plot 402), and the ESBV remains open (plot 404). The HVAC demand has stopped (plot 410) and so the alternator current no longer reflects the additional draw of the HVAC system and may reflect the draw of current by the compressor motor, as shown by plot 408. The actual compressor speed (plot 412) is now outside an expected range of the expected compressor speed (plot 411) for motor speed M3. In addition, the actual alternator current is now outside an expected range of the alternator current (plot 409) for motor speed M3. As a result, in response to the higher than threshold difference between the actual speed and the expected compressor speed, as well between the actual alternator current and the expected alternator current, a flag is raised (plot 414) at t6, indicating degradation in electrical efficiency of the supercharger. In addition, a degree of degradation in electrical efficiency of the supercharger is learned as a function of the difference between the expected compressor speed and the actual compressor speed, or the difference between the expected alternator current and the actual alternator current (or a statistical or weighted average of the two differences). For example, a degree of degradation is learned as a function of the difference between plots 411 and 412 (and/or plots 408 and 409) between t5 and t6.

At time t6, the supercharger diagnostic routine ends, and the current delivered to the compressor motor is stopped (plot 406), causing the compressor to wind down (plot 412). The position of the ESBV may return to a position suitable for the given operating conditions, as shown by plot 404. In the depicted example, the engine remains at idle speed (plot 402) with no HVAC demand (plot 410). The alternator current may remain low, and it has been drawn down by operating vehicle systems during idle without substantial recharge (plot 408).

At time t7, the operator tips-in indicating an increased torque demand. As a result, the ESBV may close (plot 404) to allow incoming air to pass through the supercharger compressor and an increased amount of power may be diverted to the compressor motor in order to increase its speed (plot 406) and the speed of the compressor (plot 412). As a result of the degraded supercharger efficiency exhibited during the supercharger diagnostic routine, an additional amount of power may be delivered to the compressor motor, as shown by plot 406, in order to increase the compressor speed (plot 412) to meet a given torque demand. In particular, the motor speed required for providing a boost pressure that meets the given operator torque demand is shown at dashed segment 407. However, due to the indication of supercharger degradation, the actual power commanded to the motor is raised causing the motor speed to be raised higher, and to be held raised for a longer duration (as indicated by plot 406 being higher than plot 407 for a longer duration after t7). Herein the motor speed is raised over the required level as a function of the determined degree of duration.

It will be appreciated that in the depicted example, the determined degree of degradation may have been below a threshold, such that an increase of power delivered to the supercharger motor is sufficient to compensate for the degradation and meet torque demand without compromising fuel economy or emissions. Additionally, the compressor motor may be operated at an increased speed and/or for an increased duration in order to meet torque demands. In other examples, if the degree of degradation is determined to be above the threshold, above which the supercharger operation may be compromised, following the indication of degradation, supercharger operation may be disabled during a subsequent increase in torque demand. For example, responsive to a tip-in, the supercharger compressor may remain disabled and boost pressure may be provided only via the turbocharger compressor. As a result of operating the engine without the electric supercharger, a turbo lag may be accepted during a tip-in.

In this way, an electrical efficiency of an electric supercharger may be directly measured. By monitoring supercharger compressor speed following step-wise incremental commands to the electrical motor driving the compressor, a change in motor output commanded at each step may be correlated with changes in supercharger compressor speed. Based on deviations in the compressor speed from the expected speed, reduced spinning of the compressor may be learned and associated with degradation of the supercharger efficiency. The technical effect of also monitoring a vehicle current, such as an alternator current, following the step-wise incremental commands to the electrical motor, even as other (e.g., auxiliary) electrical loads on the engine vary, is that a change in motor output commanded at each step may be correlated with changes in vehicle current. This enables the efficiency of the conversion of electrical power received at the motor to rotational energy of the compressor to be measured directly and reliably. In addition, the supercharger may be diagnosed without limiting engine functions. By diagnosing the supercharger during engine idling conditions, boosted engine operation is not affected. In addition, the impact of changing manifold pressure and air flow on the diagnosis is reduced. By reliably diagnosing the supercharger's electrical efficiency, supercharger operations may be adjusted in accordance, reducing turbo lag experienced at a downstream turbocharger during boosted engine operation.

In one example, a method for a vehicle comprises: during engine idling conditions, opening a bypass coupling an electric supercharger to an intake passage; operating an electric motor of the supercharger with step-wise incremented output; and indicating degradation of the supercharger based on a change in each of supercharger compressor speed and vehicle current following the operating. In the preceding example, additionally or optionally, the indicating based on the change in vehicle current includes indicating based on the change in vehicle current following the operating, as vehicle electrical demands vary. In any or all of the preceding examples, additionally or optionally, indicating degradation includes indicating a degree of electrical degradation of the supercharger based on the change in each of the supercharger compressor speed and the vehicle current following the operating. In any or all of the preceding examples, additionally or optionally, the method further comprises, during a subsequent boosted engine operating condition, responsive to the degree of electrical degradation being lower than a threshold, commanding a higher duty cycle to the electric motor. In any or all of the preceding examples, additionally or optionally, opening the bypass includes commanding a bypass valve open. In any or all of the preceding examples, additionally or optionally, operating the electric motor includes commanding a first output to the electric motor; then commanding a second output, higher than the first output, to the electric motor; and then commanding a third output, higher than the second output, to the electric motor. In any or all of the preceding examples, additionally or optionally, the indicating includes comparing the change in the compressor speed and the vehicle current following the first output to a first threshold; comparing the change in the compressor speed and the vehicle current following the second output to a second threshold; comparing the change in the compressor speed and the vehicle current following the third output to a third threshold; and indicating degradation if one or more of the change following the first output is less than the first threshold, the change following the second output is less than the second threshold, and the change following the third output is less than the third threshold. In any or all of the preceding examples, additionally or optionally, the vehicle current includes an alternator current, each of the alternator and the electric motor coupled to a system battery. In any or all of the preceding examples, additionally or optionally, the electric supercharger is coupled upstream of a turbocharger in the intake passage.

Another example method comprises: while operator torque demand is lower than a threshold, and while electrical demands on a vehicle alternator vary, opening a bypass valve to couple a supercharger compressor to an engine intake passage; step-changing a duty cycle commanded to an electric motor driving the compressor; monitoring a change in compressor speed and alternator current after each step of the step-changing; and indicating degradation in supercharger electrical efficiency responsive to the monitored change. In the preceding example, additionally or optionally, the indicating includes comparing the monitored change to an expected change, the expected change based on the step-changed duty cycle. In any or all of the preceding examples, additionally or optionally, comparing the monitored change to the expected change in alternator current includes updating the monitored change to compensate for the varying vehicle electrical demands. In any or all of the preceding examples, additionally or optionally, the indicating includes indicating the degradation when the monitored change in at least one of the compressor speed and the alternator current is lower than the expected change; and indicating a degree of the degradation based on a difference between the monitored change and the expected change. In any or all of the preceding examples, additionally or optionally, the method further comprises: when the degree of the degradation is higher, updating an accelerator pedal map to reduce reliance on the supercharger for a given boost pressure; and when the degree of the degradation is lower, commanding a higher duty cycle to the electric motor for the given boost pressure. In any or all of the preceding examples, additionally or optionally, the electric motor is powered using electrical energy drawn from each of a system battery, the system battery drawing electrical energy from the vehicle alternator, and wherein the electrical demands on the vehicle alternator varying include the alternator current drawn by the alternator from the system battery varying based on one or more of operator cabin cooling demand, state of charge of the system battery, and vehicle window defroster. In any or all of the preceding examples, additionally or optionally, the operator torque demand being lower than a threshold includes the engine operating without boost being provided by the supercharger compressor or a turbocharger compressor coupled downstream of the supercharger compressor in the intake passage.

Another example vehicle system comprises, an engine having an intake; a first intake compressor driven by an electric motor; a second intake compressor driven by an exhaust turbine positioned downstream of the first compressor along the intake; a bypass including a bypass valve coupled across the first compressor; a battery providing electrical power to the electric motor; an alternator coupled to the engine and providing electrical power to the battery and one or more engine electrical loads; a speed sensor for estimating a speed of the first compressor; an electrical circuit for estimating a current drawn on the alternator; and a controller with computer readable instructions stored on non-transitory memory for: during engine idling conditions, with the bypass valve open, sequentially commanding duty cycles of step-wise increasing or decreasing pulse-width to the electric motor; following each commanded pulse-width, monitoring a change in each of the speed of the first compressor and the alternator current; responsive to the monitored change being less than a threshold, indicating degradation in supercharger electrical efficiency; and responsive to the indication of degradation, limiting a boost pressure applied via the first compressor during subsequent boosted engine operation. In the preceding example, additionally or optionally, indicating degradation includes indicating a degree of the degradation as a function of a difference between the monitored change and the threshold, and wherein the limiting the boost pressure applied via the first compressor during the subsequent boosted engine operation includes responsive to the degree of degradation being higher than a threshold, holding the bypass valve open, independent of operator torque demand; and responsive to the degree of degradation being lower than the threshold, compensating for the degradation by increasing a duty cycle commanded to the electric motor. In any or all of the preceding examples, additionally or optionally, the threshold is based on the commanded pulse-width, the threshold increased as the commanded pulse-width is step-wise increased or decreased. In any or all of the preceding examples, additionally or optionally, the vehicle is a hybrid vehicle, the system further comprising a vehicle cabin and an air conditioner, and wherein the controller includes further instructions for: continually varying the alternator current drawn on the alternator based on the electrical loads applied via each of operator cabin cooling demand, battery charging requirement, and motor torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle having an alternator, comprising:
during engine idling conditions,
opening a bypass coupling an electric supercharger to an intake passage;
operating an electric motor of the supercharger with step-wise incremented output;
determining speed of a compressor of the supercharger and current of the alternator; and
indicating degradation of the supercharger based on a change in each of supercharger compressor speed and alternator current following the operating, includes indicating a degree of electrical degradation of the supercharger based on the change in each of the supercharger compressor speed and the alternator current following the operating.

2. The method of claim 1, wherein the indicating based on the change in alternator current includes indicating based on the change in alternator current following the operating, as vehicle electrical demands vary.

3. The method of claim 1, further comprising, during a subsequent boosted engine operating condition, responsive to the degree of electrical degradation being lower than a threshold, commanding a higher duty cycle to the electric motor.

4. The method of claim 1, wherein opening the bypass includes commanding a bypass valve open.

5. The method of claim 1, wherein each of the alternator and the electric motor are coupled to a system battery.

6. The method of claim 1, wherein the electric supercharger is coupled upstream of a turbocharger in the intake passage.

7. The method of claim 1, wherein operating the electric motor includes:
commanding a first output of the electric motor;
then commanding a second output, higher than the first output, of the electric motor; and
then commanding a third output, higher than the second output, of the electric motor.

8. The method of claim 7, wherein the indicating includes:
comparing the change in the compressor speed and the alternator current following the first output to a first threshold;
comparing the change in the compressor speed and the alternator current following the second output to a second threshold;
comparing the change in the compressor speed and the alternator current following the third output to a third threshold; and
indicating degradation if one or more of the change following the first output is less than the first threshold, the change following the second output is less than the second threshold, and the change following the third output is less than the third threshold.

9. A method, comprising:
while operator torque demand is lower than a threshold, and while electrical demands on a vehicle alternator vary,
opening a bypass valve to couple a supercharger compressor to an engine intake passage;
step-changing a duty cycle commanded to an electric motor driving the compressor;
monitoring a change in compressor speed and alternator current after the step of the step-changing; and
indicating degradation in supercharger electrical efficiency responsive to the monitored change.

10. The method of claim 9, wherein the electric motor is powered using electrical energy drawn from each of a system battery, the system battery drawing electrical energy from the vehicle alternator, and wherein the electrical demands on the vehicle alternator varying include the alternator current drawn by the alternator from the system battery varying based on one or more of operator cabin cooling demand, state of charge of the system battery, and vehicle window defroster.

11. The method of claim 9, wherein the operator torque demand being lower than the threshold includes the engine operating without boost being provided by the supercharger compressor or a turbocharger compressor coupled downstream of the supercharger compressor in the intake passage.

12. The method of claim 9, wherein the indicating includes comparing the monitored change to an expected change, the expected change based on the step-changed duty cycle.

13. The method of claim 12, wherein comparing the monitored change to the expected change in alternator current includes updating the monitored change to compensate for the varying vehicle electrical demands.

14. The method of claim 12, wherein the indicating includes:
indicating the degradation when the monitored change in at least one of the compressor speed and the alternator current is lower than the expected change; and
indicating a degree of the degradation based on a difference between the monitored change and the expected change.

15. The method of claim 14, further comprising:
when the degree of the degradation is higher, updating an accelerator pedal map to reduce reliance on the supercharger for a given boost pressure; and
when the degree of the degradation is lower, commanding a higher duty cycle to the electric motor for the given boost pressure.

16. A vehicle system, comprising:
an engine having an intake;
a first intake compressor driven by an electric motor;
a second intake compressor driven by an exhaust turbine positioned downstream of the first compressor along the intake;
a bypass including a bypass valve coupled across the first compressor;
a battery providing electrical power to the electric motor;
an alternator coupled to the engine and providing electrical power to the battery and one or more engine electrical loads;
a speed sensor for estimating a speed of the first compressor;
an electrical circuit for estimating a current drawn on the alternator; and
a controller with computer readable instructions stored on non-transitory memory for:
during engine idling conditions,
with the bypass valve open, sequentially commanding duty cycles of step-wise increasing or decreasing pulse-width to the electric motor;
following each commanded pulse-width, monitoring a change in each of the speed of the first compressor and the alternator current;
responsive to the monitored change being less than a threshold, indicating degradation in supercharger electrical efficiency; and
responsive to the indication of degradation, limiting a boost pressure applied via the first compressor during subsequent boosted engine operation.

17. The system of claim 16, wherein indicating degradation includes indicating a degree of the degradation as a function of a difference between the monitored change and the threshold, and wherein the limiting the boost pressure applied via the first compressor during the subsequent boosted engine operation includes:
responsive to the degree of degradation being higher than a threshold, holding the bypass valve open, independent of operator torque demand; and
responsive to the degree of degradation being lower than the threshold, compensating for the degradation by increasing a duty cycle commanded to the electric motor.

18. The system of claim 16, wherein the threshold is based on the commanded pulse-width, the threshold increased as the commanded pulse-width is step-wise increased or decreased.

19. The system of claim 16, wherein the vehicle is a hybrid vehicle, the system further comprising a vehicle cabin and an air conditioner, and wherein the controller includes further instructions for:
continually varying the alternator current drawn on the alternator based on electrical loads applied via each of operator cabin cooling demand, battery charging requirement, and motor torque.

* * * * *